United States Patent [19]

Wagner

[11] Patent Number: 5,583,382
[45] Date of Patent: Dec. 10, 1996

[54] SWITCHING SYSTEM FOR THE INTERIOR ILLUMINATION OF MOTOR VEHICLES

[75] Inventor: Armin Wagner, Karlsfeld, Germany

[73] Assignee: Bayerische Motoren Werke AG, Munich, Germany

[21] Appl. No.: 218,594

[22] Filed: Mar. 28, 1994

[30] Foreign Application Priority Data

Mar. 26, 1993 [DE] Germany .................... 43 09 817.7

[51] Int. Cl.[6] .................................................. H05B 37/00
[52] U.S. Cl. .................. 307/10.1; 307/10.8; 315/82; 315/83; 315/84
[58] Field of Search ...................... 307/9.1, 10.1, 307/10.8; 315/77, 84, 82, 83; 340/457, 458, 459; 362/36, 37

[56] References Cited

U.S. PATENT DOCUMENTS

| | | | |
|---|---|---|---|
| 3,879,617 | 4/1975 | Faller | 307/10.8 |
| 4,122,371 | 10/1978 | Talmage et al. | 315/84 |
| 4,739,224 | 4/1988 | Geerlings | 315/84 |
| 4,866,345 | 9/1989 | Kataoka | 315/84 |
| 5,047,688 | 9/1991 | Alten . | |
| 5,206,562 | 4/1993 | Matsuno et al. | 315/84 |
| 5,321,309 | 6/1994 | Kolomyski | 315/84 |
| 5,357,169 | 10/1994 | Toyozumi et al. | 315/77 |
| 5,406,171 | 4/1995 | Moody | 307/10.8 |

FOREIGN PATENT DOCUMENTS

| | | |
|---|---|---|
| 0138919 | 5/1985 | European Pat. Off. . |
| 2451845 | 10/1980 | France . |
| 3204837 | 8/1983 | Germany . |
| 3218479 | 11/1983 | Germany . |
| 3309548 | 2/1985 | Germany . |
| 2854729 | 1/1987 | Germany . |
| 3532338 | 3/1987 | Germany . |
| 58-63534 | 4/1983 | Japan . |
| 58-67534 | 4/1983 | Japan . |

*Primary Examiner*—William M. Shoop, Jr.
*Assistant Examiner*—Peter Ganjoo
*Attorney, Agent, or Firm*—Evenson, McKeown, Edwards & Lenahan, P.L.L.C.

[57] ABSTRACT

A circuit for internal illumination of motor vehicles having a controller, coupled to the internal illumination, that automatically turns the internal illumination on and off as a function of operating state parameters of the motor vehicle according to a predetermined switching program. The controller is a deliberately operable electrical controller. The circuit also includes a control device, coupled to and controlled by the controller, that switches the switching program off and the internal illumination permanently on in response to being controlled by the controller.

16 Claims, 2 Drawing Sheets

SWITCHING SYSTEM FOR THE INTERIOR ILLUMINATION OF MOTOR VEHICLES

BACKGROUND AND SUMMARY OF THE INVENTION

The invention relates to a circuit for internal illumination of motor vehicles in which controller automatically turns the internal illumination on and off as a function of the operating state parameters of the motor vehicle, according to a predetermined switching program.

A circuit of this type known from German Patent Document 28 54 729. This circuit is used in the vehicles built by Bayerische Motoren Werke AG. According to the used embodiment of the circuit, there is a manually operable switch in the vicinity of one of the internal illuminating fixtures which has three switch positions. In one position the switch switches the control device for performing the switching program. In another position, the internal illumination is switched on permanently. In the third position the internal illumination is switched off. A problem produced by the switching program, in which, after leaving the vehicle or after entering the vehicle, the internal illumination remains switched on for a certain period of time after the vehicle doors are finally closed, is that the vehicle user does not know, after the vehicle doors are closed, whether the switching program is turned on and the internal illumination will be switched off automatically or whether the internal illumination is set to remain on. The controller likewise does not give the unknowing vehicle user any indication.

There is also an additional problem that arises from the circuitry of the switch. The switch described has one terminal as the positive pole of the electrical system. This requires costly wiring, a high weight of the current-carrying wire, and special insulating measures.

An object of the present invention is to provide a switching arrangement of the initially-described type in which a change of the operating mode of the internal illumination can be accomplished at low circuit-design expense.

This and other objects are achieved by the present invention which provides a circuit for internal illumination of motor vehicles comprising a controller, coupled to the internal illumination, that automatically turns the internal illumination on and off as a function of operating state parameters of the motor vehicle according to a predetermined switching program, wherein the controller is a deliberately operable electrical controller. The circuit also includes a control device, coupled to and controlled by the controller, that switches the switching program off and the internal illumination permanently on in response to being controlled by the controller.

The present invention provides a low-load control line to the control device. There is no longer any doubt about the effective operating mode of the internal illumination, since the switching program is basically set and internal illumination remains switched on only following a deliberate actuation of the controller. In other words, if the vehicle user, before leaving the vehicle, does not deliberately actuate the controller, he can be sure that the internal illumination will be switched off according to the switching program after he leaves the vehicle. On the other hand, if he has actuated the controller, depending on the design, the internal illumination can remain switched on after leaving the vehicle or at least until the person has left the vehicle. In the latter case, the light is then switched off according to the switching program after leaving the motor vehicle.

The present invention offers considerable advantages as far as weight, electrical safety, and operating comfort of the vehicle user are concerned.

The design of the invention can have different forms. Thus the switching time of the internal illumination in the "permanently on" mode can be limited with respect to time. It has been found that an interval of 15 minutes for example after finally leaving the motor vehicle or after switching on this operating mode is desirable.

The time limit can also be set to a shorter value when, because of the behavior of the vehicle user, it is evident that he no longer requires the internal illumination. It may be advantageous in this regard to switch off the internal illumination when giving a locking command for a vehicle door or for the central locking system of the motor vehicle, immediately or after a delay of several seconds.

In certain embodiments, this switching off occurs when the electrical system of the motor vehicle is in a switching state characteristic of shutting down. For example, this will occur when the ignition of the motor vehicle is turned off. Again, switching off can be delayed, for example, after the final closing of the vehicle doors.

In addition to setting the "permanently on" mode for the internal illumination, in certain embodiments it is possible to actuate the controller again to deliver a switching command to the controller which switches the controller back to the switching program operating mode. This measure is used when the vehicle user, for example with the vehicle parked, considers the constant switching on of the internal illumination to be no longer necessary, but also does not intend to leave the vehicle.

It can also be advantageous if the internal illumination can be switched off permanently, although the vehicle doors are open for example. Such a case occurs when the motor vehicle is in a repair shop. In addition, with the aid of the same controller, a different switching command can be delivered to the controller. Instead of an additional controller provided for the purpose, this offers a considerable advantage as far as the number of required components is concerned.

In this differently designed switching command, for example, multiple brief actuation of the controller onto its switching position or an adjustment of the controller in its switching position for a specific space of time, may be involved. The latter can be accomplished by the controller remaining in its control position for a period of several seconds, i.e. a period of time which is completely unusual for conventional command and operating processes, and then returned from this state back to its basic position.

The controller itself can be a switch of any design. In contrast to the design of the switch as a toggle switch, the design of the switch as a pushbutton switch has the advantage of simple design and ease of operation.

DETAILED DESCRIPTION OF THE DRAWINGS

Figure 1:
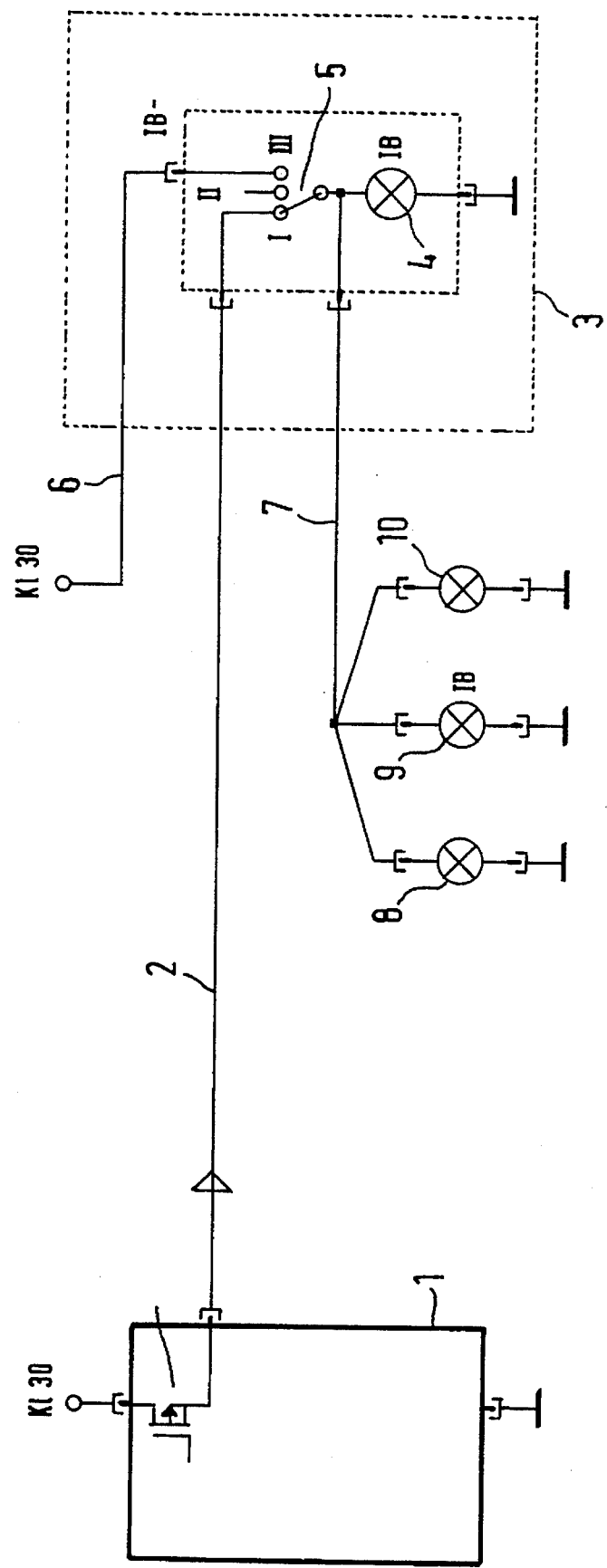
FIG. 1 is a circuit according to the prior art.

The circuit shown in FIG. 1 contains a control device connected with the positive pole of the electrical system (K130) and the ground of the electrical system. From control device 1 a lead 2 runs to a module 3 located in the roof area (not shown) inside the motor vehicle. The module 3 contains an illuminating element 4 as part of the internal illumination as well as a switch 5 which can be set to three different positions I, II, and III. In addition a line 6 is connected to the positive pole Kl30 of the electrical system. Another line 7 runs from the module 3, and serves to power additional illuminating elements 8, 9, and 10 of the internal illuminating which are located in the foot area (8 and 10) and in the rear (9) of the interior of the motor vehicle.

Figure 2:
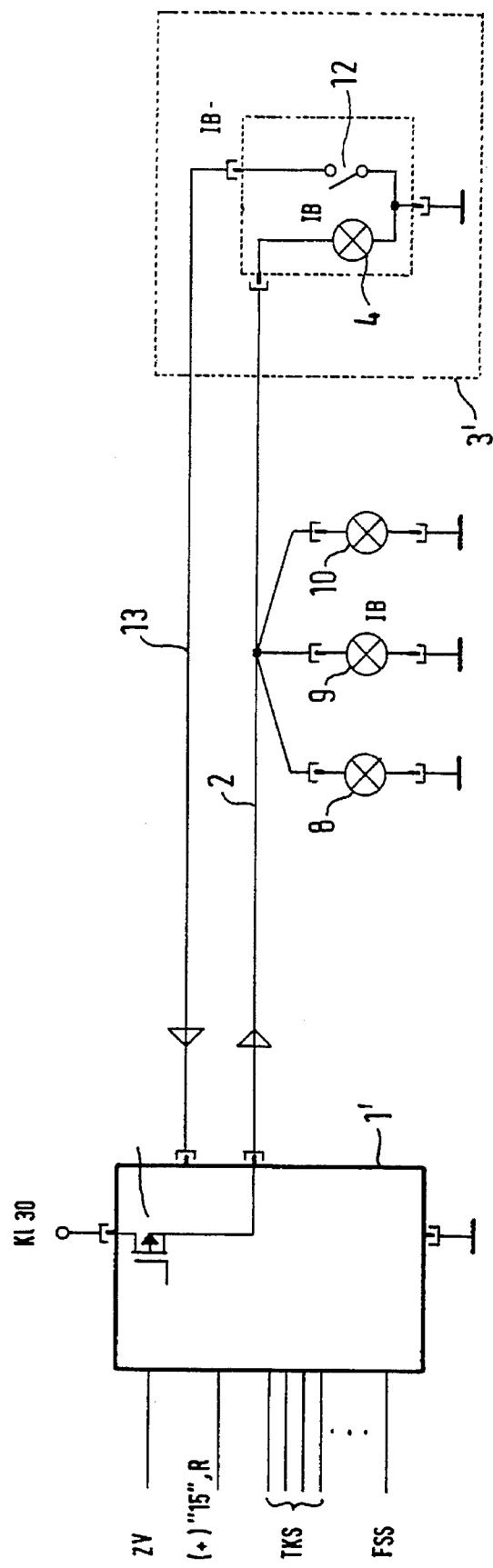
FIG. 2 is a circuit constructed according to an embodiment of the present invention.

With the aid of switch 5, a switching program for the internal illumination control located in control device 1 can be adjusted. In position II the internal illumination remains turned off. In position III the internal illumination remains turned on. Three leads that are used to supply power to illuminating elements 8 to 10 run to module 3. In contrast to this, in the circuit according to the invention as shown in FIG. 2, only one lead 2 is provided which uses its segment leading to module 3' corresponding to module 3, to supply only illuminating element 4 with current. Illuminating elements 8 to 10 are connected directly to line 2 as viewed in the flow direction upstreams of module 3'. Module 3' contains only a pushbutton switch 12 which switches a low-load control line 13 between control device 1' and the vehicle ground.

Switching commands can be delivered by pushbutton switch 12, as explained below. This pushbutton switch 12 acts as the controller. The programming or wiring of the control device 1' to respond to the switching commands is easily performed by one of ordinary skill in the art.

First we will assume that we have the case in which the ordinary operating mode "switching program" is set. Pushbutton switch 12 is in the position shown. In accordance with the ordinary operating mode "switching program", the internal illumination is switched on during getting in and out of the vehicle, for example for overshoot times of different lengths, and in addition makes this switching on dependent on the state of the vehicle illuminating system (see for example German Patent Document 36 28 345). If pushbutton switch 12 is actuated briefly, i.e. briefly connecting lead 13 to ground potential (several msec or tenths of a second), instead of using the ordinary operating mode switching program, the control device 1', turns illuminating element 4 as well as elements 8 to 10 permanently on. If such a switching command is given again with the aid of pushbutton 12, control device 1' again turns on the conventional switching program. In addition, by holding pushbutton switch 12 in the actuating position for a period of 3 seconds for example, control device 1' can turn off the internal illumination permanently.

Now assume that we have the case mentioned at the outset in which the internal illumination remains turned on permanently after brief actuation of pushbutton switch 12 of the controller. Control device 1', being suitably configured, when a locking command for the vehicle doors is present (shown in FIG. 2 as input signal ZV) switches off the internal illumination with a few seconds delay after this switching command appears. It is also possible, by interrupting the ignition circuit indicated by the numerals "15" or "R", to turn off an initially permanently switched-on internal illumination after a certain period of time, 10 seconds for example. This can also be done as a function of the closing of the vehicle doors which are provided with door contact switches, not shown. The door contact switches are connected by inputs TKS with control device 1'. In addition, the signal from a radio closing system, not shown, indicated by an input FSS of control device 1', can also switch off the internal illumination.

This results in a definite improvement of functionality with simultaneous reduction of construction cost.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Circuit for internal illumination of motor vehicles comprising:

a controller, coupled to the internal illumination, that automatically turns the internal illumination on and off as a function of operating state parameters of the motor vehicle according to a predetermined switching program, wherein the controller is a deliberately operable electrical controller;

a control device having a switching command input, coupled to and receiving switching commands from the controller, said control device further having an output for providing illuminating current to the internal illumination, wherein said control device switches the switching program off and the internal illumination permanently on in response to a switching command from the controller.

2. Circuit according to claim 1, wherein an on-time of the internal illumination is limited.

3. Circuit according to claim 2, wherein the internal illumination is switched off when a locking command is received.

4. Circuit according to claim 3, wherein the control device includes means for switching off the internal illumination when a switching state is present which is representative of turning off of the motor vehicle.

5. Circuit according claim 4, wherein the switching program is activated when the control device is actuated again by the controller.

6. Circuit according to claim 5, wherein when a different switching command is given by the controller, the internal illumination can be switched off permanently.

7. Circuit according to claim 6, wherein the switching command can be triggered by an adjustment of the controller for a predetermined switching time of several seconds.

8. Circuit according to claim 7, wherein the controller is a pushbutton switch.

9. Circuit according to claim 8, wherein the controller is integrated with an internal illuminating device.

10. Circuit according to claim 1, wherein the internal illumination is switched off when a locking command is received.

11. Circuit according to claim 1, wherein the control device includes means for switching off the internal illumination when a switching state is present which is representative of turning off of the motor vehicle.

12. Circuit according claim 1, wherein the switching program is activated when the control device is actuated again by the controller.

13. Circuit according to claim 1, wherein when a different switching command is given by the controller, the internal illumination can be switched off permanently.

14. Circuit according to claim 1, wherein the switching command can be triggered by an adjustment of the controller for a predetermined switching time of several seconds.

15. Circuit according to claim 1, wherein the controller is a pushbutton switch.

16. Circuit according to claim 1, wherein the controller is integrated with an internal illuminating device.

* * * * *